United States Patent [19]

Vaughn et al.

[11] Patent Number: 4,764,438
[45] Date of Patent: Aug. 16, 1988

[54] SOLID STATE TETRACHLOROALUMINATE STORAGE BATTERY HAVING A TRANSITION METAL CHLORIDE CATHODE

[75] Inventors: Robert L. Vaughn, Grand Forks, N. Dak.; Ronald A. Carpio; Lowell A. King, both of Colorado Springs, Colo.

[73] Assignee: The United States of America as represented by the Secretary of the Air Force, Washington, D.C.

[21] Appl. No.: 741,516

[22] Filed: Jun. 5, 1985

Related U.S. Application Data

[62] Division of Ser. No. 556,874, Dec. 1, 1983, abandoned.

[51] Int. Cl.[4] .................. H01M 10/44; H01M 6/36
[52] U.S. Cl. ................................ 429/52; 429/103; 429/112
[58] Field of Search ................ 429/52, 51, 50, 112, 429/103, 191, 218, 199

[56] References Cited

U.S. PATENT DOCUMENTS

| 3,877,984 | 4/1975 | Werth | 429/103 |
|---|---|---|---|
| 3,969,139 | 7/1976 | Lai | 429/103 |
| 4,057,676 | 11/1977 | Rao et al. | 429/50 |
| 4,066,824 | 1/1978 | Rao et al. | 429/50 |
| 4,207,388 | 6/1980 | Erbacher et al. | 429/112 |

Primary Examiner—Brian E. Hearn
Assistant Examiner—Stephen J. Kalafut
Attorney, Agent, or Firm—Stanton E. Collier; Donald J. Singer

[57] ABSTRACT

A pelletized, thermally activated, lightweight power source composed of a lithium alloy solid anode, a transition metal chloride-graphite solid cathode and an alkali metal tetrachloroaluminate solid state electrolyte positioned between and in contact with said anode and cathode.

1 Claim, 1 Drawing Sheet

U.S. Patent  Aug. 16, 1988  4,764,438
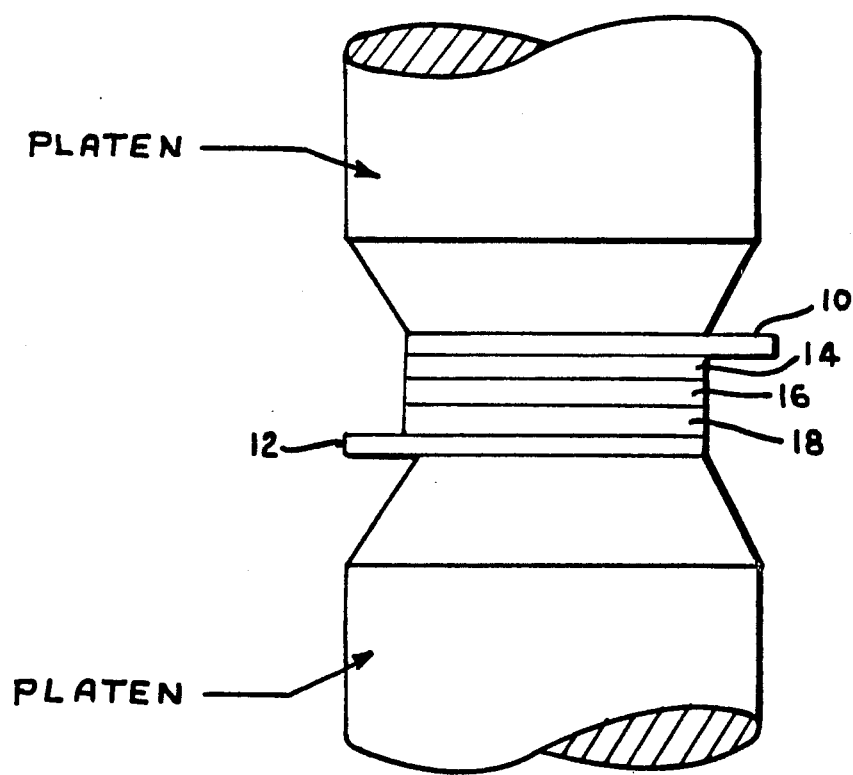

SOLID STATE TETRACHLOROALUMINATE STORAGE BATTERY HAVING A TRANSITION METAL CHLORIDE CATHODE

STATEMENT OF GOVERNMENT INTEREST

The invention described herein may be manufactured and used by or for the Government for governmental purposes without the payment of any royalty thereon.

This is a division of application Ser. No. 556,874, filed Dec. 1, 1984, now abandoned.

BACKGROUND OF THE INVENTION

This invention relates to a solid electrolyte battery of the thermal type. In a more specific aspect, this invention concerns itself with a lightweight, thermally activated, solid state, electrochemical power supply which utilizes a solid alkali metal tetrachloroaluminate electrolyte in combination with a transition metal chloride containing cathode.

The present interest in the development of lightweight electrical energy supplies for a variety of military and commercial applications has created a considerable research effort in an attempt to provide even more reliable and efficient thermally activated, solid state electrolyte batteries. Generally, the term "thermal battery" is understood to mean a battery which is activated by heating until its electrolyte melts, thereby becoming a good electrical conductor and a solvent in which the appropriate energy-producing chemical reactions can occur. The concept of thermally activating a power source provides a system which is characterized by having a virtually unlimited shelf life coupled with an extended operational life. This is accomplished by the fact that the battery is only activated when a source of power is required. Such batteries have proved to be especially useful where long life and very small currents are required, such as heart pacemaker units and permanently powered computer memory boards. These batteries are light in weight and of minimum size.

In furthering the research effort referred to above, considerable emphasis has been placed on developing power sources which utilize an alkali metal tetrachloroaluminate composition as a solid electrolyte. Such batteries are generally in pelletized form and provide a lightweight, maintenance free, high energy density power source with a relatively long shelf-life. Unfortunately, the tetrachloroaluminate solid electrolyte batteries heretofore fabricated do not possess as high a current carrying capacity and voltage as is desired for many applications.

With the present invention, however, it has been found that the use of a cupric chloride, ferric chloride, or molybdenum chloride cathode material in conjunction with an alkali metal tetrachloroaluminate electrolyte and a lithium alloy anode, provides an electrochemical power source with an unexpectedly greater current carrying capacity and higher voltage than previously exhibited by the solid state tetrachloroaluminate battery described in U.S. Pat. No. 4,066,824, issued Jan. 3, 1978 to Rao et al. The battery of this invention is also somewhat related in concept to the aluminum-chlorine thermal battery described in U.S. Pat. No. 4,064,327, issued Dec. 20, 1977 to King et al; and the tetrachloroaluminate battery described in U.S. Pat. No. 4,207,388 issued June 10, 1980 to Erbacher et al.

The battery or electrochemical power of this invention, however, differs fundamentally from the prior art in that it is not a thermal battery in accordance with the accepted definition of the term "thermal battery". Although the battery of this invention is structurally similar to a thermal battery and is thermally activated, it differs in that the electrolyte does not melt during operation, but relies instead on a significant solid state electrical conductivity. To thermally "activate" the battery means to bring it up to whatever temperature results in an acceptable value of electrolyte electrical conductivity. The battery must be externally maintained at that minimum temperature since the battery is not thermally self-sustaining.

The use of a transition metal chloride as a cathode material in conjunction with a tetrachloroaluminate solid electrolyte results in substantial improvement in open circuit voltages and current carrying capacities over the voltages and current capacities exhibited by previously known chloroaluminate batteries. This unexpected improved improvement is achieved because the metal chloride is used in a positive oxidation state rather than relying on alkali metal intercalation for the discharge reaction as is done in solid electrolyte cells which use chalcogenide containing cathodes, such as those disclosed by Rao et al, supra.

SUMMARY OF THE INVENTION

In accordance with this invention, it has been found that highly efficient, lightweight, thermally activated power sources can be fabricated by utilizing a transition metal chloride such as cupric chloride, ferric chloride, or molybdenum chloride as the cathode; and a lithium metal or lithium-aluminum or lithium-silicon alloy as the anode in combination with an alkali metal tetrachloroaluminate solid electrolyte. The power source may comprise a single cell or a stack of individual cells. A typical cell is a three layered pellet composed of a lithium alloy anode, a separating alkali metal tetrachloroaluminate solid electrolyte sandwiched between the anode and a cathode which, in turn, is composed of a mixture of the transition metal chloride and graphite. The cell is totally inert until raised to its operating temperature by any conventional heating means.

Accordingly, the primary object of this invention is to provide an improved, thermally activated, electrochemical power source.

Another object of this invention is to provide a low cost, maintenance-free, lightweight and efficient power source that is capable of operating continually or intermittently over an extended period of time.

Still another object of this invention is to provide a lightweight power source that exhibits an extended shelf life and can be thermally activated in the solid state at relatively low temperatures.

A further object of this invention is to provide a novel electrochemical power source that utilizes cupric, ferric or molybdenum chloride as a cathodic material in conjunction with an alkali metal tetrachloroaluminate solid electrolyte.

Still a further object of this invention is to provide an alkali metal tetrachloroaluminate solid electrolyte battery that exhibits a higher degree of current carrying capacity and higher voltages than achieved heretofore by previously known solid state chloroaluminate batteries.

The above and still further objects and advantages of the present invention will become more readily discernible upon consideration of the following detailed description thereof when viewed in conjunction with the accompanying drawing.

DESCRIPTION OF THE DRAWING

In the drawing:

The FIGURE represents, in schematic form, a typical cell configuration of this invention. The cell is positioned between to heated platens.

DESCRIPTION OF THE PREFERRED EMBODIMENTS

The electrochemical chemical power source of this invention comprises a pelletized, thermally activated, alkali metal tetrachloroaluminate, solid state, electrolyte battery that utilizes ferric, cupric or molybdenum chloride as its cathodic element The power source is thermally activated at relatively low temperatures on the order of from about 85° C. to 105°C. and consists of a stack or stacks of individual cells. The cell is primarily inert before activation with the chloroaluminate electrolyte remaining in its solid state. However, the chloroaluminate shows conductivity in the solid state and acts as a solid electrolyte at temperatures below the melting point of the electrolyte. Rao et al supra, demonstrates lithium tetrachloroaluminate as a solid electrolyte in cells using chalcogenide cathodes, specifically $TiS_2$. However, chalcogenide cathodes rely on alkali metal intercalation for the discharge reaction whereas the present invention relies on the use of the transition metal chloride in a positive oxidation state. Thus, the present invention provides a cell with higher voltages and currents than previously obtained with previously known chloroaluminate solid electrolyte cells which use chalcogenide cathodes.

Thermal activation of the cell of this invention can be accomplished by exploiting the solid-state conductivity of the electrolyte and the anode and cathode reactions at temperatures below the melting point of the electrolyte. The successful use of $FeCl_3$, $CuCl_2$ or $MoCl_3$ under these temperature conditions distinguishes the present invention from the conventional thermal batteries of the prior art. The battery of this invention, therefore, is raised to its operating temperature by operating within its own operational environment. For example, if used as a power source for a pacemaker, the battery would be heated by the body. In a computer, it would be heated by the surrounding air. In this battery system, both electrodes and the electrolyte are in the solid state during operating conditions. The absence of any liquid phase simplifies the battery construction. Since Li—Al and Li—Si alloys have higher melting points (e.g., Li—Si melts at 300°-350°), there is no need to be concerned about the containment of the anode. This battery is made possible by the high electrical conductivity of alkali metal chloroaluminates in the solid state. The ionic conductances at 25° C. are $1.2 \times 10^{-6}$, $3.5 \times 10^{-7}$ and $3.2 \times 10^{-9}$ $-1_{cm}-1$, respectively for $LiAlCl_4$, $NaAlCl_4$ and $KAlCl_4$. Thus, $LiAlCl_4$ is the preferred embodiment electrolyte. The battery of this invention is strictly a primary (non-rechargeable) battery providing a higher energy density than was achieved by the secondary (rechargeable) battery defined in U.S. Pat. No. 4,066,824 to Rao et al, supra..

Previous thermal batteries actually operated by melting the electrolyte and, therefore, are capable of high currents. The present invention, however, exploits the solid-state conductivity of the electrolyte in a manner similar to Rao, supra, but, more importantly, exploits the successful operation of the anode and cathode reactions at temperatures below the melting point of the electrolyte. It is the successful use of $FeCl_3$, $CuCl_2$ and $MoCl_5$ under these temperature conditions that distinguishes the battery of this invention from previously known thermal batteries; and they operate more efficiently than batteries such as those described by Rao, supra, which rely on intercalation electrodes.

A number of cells which can be used in a thermally activated battery were fabricated in accordance with the teachings of this invention. The FIGURE in the drawing discloses the features of a typical pelletized cell positioned between two heated plates or platens which can be used to raise the temperature of the battery to its operational temperature, if desired. The cell comprises two current collectors 10 and 12 with an anode 14, a solid electrolyte 16 and a cathode 18 sandwiched therebetween. The pelletized cell was formed in a 1.125 inch carver die. The desired weight of anode material 14 was spread evenly over the die surface. A layer 16 of the electrolyte material was spread evenly over the anode material and both were then pressed into a bipellet. A third layer, consisting of a mixture of ferric chloride material and graphite was spread over the bipellet and pressed to form the cathode 18. A ratio of one to five parts by weight of ferric chloride to one part by weight graphite was found to be suitable. Mixtures of about 0.2 gram $FeCl_3$ to 0.2 grams of C; 1.0 gms of $FeCl_3$ to 0.2 gms C; and 0.5 gms of $FeCl_3$ to 0.2 gms C were specifically formulated. The completed cell, about 0.1 inch thick, comprised a three-layered pellet consisting of an electrolyte sandwiched between an anode and a cathode. There are considerable possible variations in the anode, electrolyte and cathode compositions, die pressure, and amount of material in each layer of the cell. For example, the anode material may consist of a lithium/aluminum or a lithium/silicon alloy; the electrolyte can be either lithium, potassium or sodium tetrachloroaluminate; while the cathode material can be a mixture in a ratio of from about one part by weight graphite to one to five parts by weight of either ferric chloride, cupric chloride or molybdenum chloride.

As a result, the Example that follows should be considered as illustrative of the invention and not as limiting the scope of the invention in any way. Also, it should be noted that no disclosure of the heating means, multiple cell stacks, nor typical cell containers is presented since such heating means are in no way necessary as the battery can be raised to its operational temperature by being subjected to the heat generated within its own operational environment. These technologies are well known to those skilled in the art and the cells of this invention can be easily accommodated to conventional thermal battery structural configurations and ancillary heating means, if desired.

The fabrication of a specific cell in accordance with this invention is disclosed by the following example.

EXAMPLE

A lithium-silicon alloy containing 40 weight percent lithium was received in powder from the manufacturer (Foote Mineral Co.) and was used without further treatment as the anode material. 0.200 grams of the anode material was placed in a carver die and 1.000 grams of lithium tetrachloroaluminate (50 mole fraction LiCl, 50 mole fraction $AlCl_3$) was then spread evenly over the anode material and pressed at 2750 psig to form the anode 14 and electrolyte 16 in the form of a bipellet. A mixture containing 0.2 grams of ferric chloride and 0.2 grams of graphite was spread over the electrolyte portion of the bipellet and pressed at 3500 psig to form the cathode 18. Current collectors 10 and 12, 1.9 cm in diameter each plus tab, were formed from pure molybdenum sheet and burnished with 400 wet/dry sandpaper before use. They were then washed with water and acetone and stored under an argon inert atmosphere until attached to the anode 14 and cathode 16. If the collectors were stored longer than 24 hours they were burnished again just prior to use.

The fabrication of the cell of this invention, preparation of the electrolyte, and the single cell discharge testing procedures, which will be explained in greater detail hereinafter, were conducted in either a nitrogen or agon filled inert atmosphere system (Vacuum Atmospheres Co. Model HE-43-6 Dri-Lab/HE-493 Dri-Train). The moisture content was maintained below 15 PPMv and the oxygen content was estimated to be 5 PPMv. All experiments were performed under an argon atmosphere to preclude formation of lithium nitrides and the associated lithium fire hazard.

The anodic and cathodic current collectors 10 and 12 may be either nickel, tungsten, stainless steel, or molybdenum. Operating temperatures ranged from 85° C. to 105°C. The single cells were typically held in position between the platens with pressure of about 3.0 to 4.5 psia.

In preparing the electrolyte medium, aluminum chloride was fused with excess lithium chloride at 175° C. and electrolytically purified for 24 hours. Ten w/o (weight percent) Cab-O-Sil was combined with the molten LiCl-AlCl$_3$ mixture at 175° C. to form a homogeneous paste, 10 w/o in the binder. The resulting electrolyte binder was cooled, ground to a powder with a CRC Micro-Mill and stored under an inert argon atmosphere. This tetrachloroaluminate/binder mix was used as the separating electrolyte 16.

The aluminum chloride was anhydrous iron free A.G. aluminum chloride obtained from Fluka through Tridom Chemical Inc. and was used as received. The lithium chloride was "Baker Analyzed" reagent grade lithium chloride and used as received. The binding agent used to immobilize electrolyte was Cab-O-Sil, a high surface area fumed silicon dioxide obtained from the Cabot Corporation. It was dried at 400° C. for one hour prior to use.

The graphite component was a commercial graphite obtained from either Fisher Scientific Co. (Grade #38), Alfa-Ventron, Inc. (99.5% pure, 300 mesh), or Superior Graphite Co. (No. 1 large graphite flakes). The Superior graphite flakes were ground before use in a CRC Micro-Mill while the others were used as received. Half of the ground graphite flakes were also purified at 600° C. under a chlorine atmosphere.

The lithium silicon alloy was obtained from Foote Mineral Co. and stored under an argon atmosphere. The alloy powders were used as received.

Single cells fabricated in accordance with this invention were tested by discharging in a conventional Platen Press Single Cell Tester. The platen heads were heated by means of two Thunderbolt TB-381, 120 V, 100 watt cartridge heaters (Vulcan Electric Inc.) in each platen wired in parallel to an Electromax III Controller (Leeds and Northrup, Inc.). Chromel-alumel thermocouples were used as temperature sensors. Temperature readout was obtained from an ice/water referenced chromel-alumel thermocouple connected to a DANA Model 5330/700 digital multimeter (DMM). The analog output from the DMM was recorded graphically using an H-P 7100 B recorder. Each platen could be heated from room temperature to a stable 0.05° C. in about two minutes and be controlled to ±0.3° C. Pressure on the single cells during testing was maintained at 3±0.25 psia using high purity argon. In testing constant current discharge, an additional set of leads was connected across the single cell which allowed the cell voltage to be sampled by a DEC PDP 11/10C Data Acquisition system. Cell voltage,, time, coulombs, experimental energy density, and the digital voltage-time curve for each cell were output by the D.

The specific cell configuration of the example was tested by placing the cell components in a platen press and holding them with a 10-pound weight. The platen was heated to 105° C. The cell was discharged at 50 μA constant current (7.80 μA/cm$^2$). The open circuit potential was 3.35V and the potential on the 50 μA-load was 3.27V. After 25 hours of discharge the voltage was 1.82V. Other tests were conducted at various temperatures of from 35° C. to 105° C. The additional voltage and current data from these tests are presented in Table I.

TABLE I

| TEMP TEMP (°C.) | OVC | LOAD CURRENT (uA) | VOLTAGE ON LOAD (V) |
|---|---|---|---|
| 105 | 3.35 | 50 | 3.27 |
|  |  | 1280 | 2.60 |
| 85 | 3.26 | 100 | 2.68 |
|  |  | 200 | 2.13 |
|  |  | 300 | 1.55 |
| 35 | 2.72 | 10 | 2.31 |
|  |  | 20 | 1.90 |
|  |  | 30 | 1.49 |

The cell illustrated in Table I and operating at 85° C. and 100 μA constant current operated for over 320 hrs at which time the voltage was still 2.29V. This cell had a cathode containing 1.0g FeCl$_3$ and 0.23g graphite.

As can be seen from a consideration of the above detailed description, the present invention provides a lightweight, low cost, expendable, low temperature activated, solid state, electrochemical power source of practical design. It provides for the implementation of high energy density expendable, primary thermal batteries in pelletized form which utilize an alkali metal tetrachloroaluminate solid electrolyte in combination with a ferric chloride cathode. It offers an opportunity to combine the unlimited shelf life and high energy density characteristics of thermally activated reserve batteries with an unexpectedly long, active life expectancy. It is the first relatively low temperature, solid, fusible, chloroaluminate salt battery capable of operating at temperatures of from about 85° to 105° C. and at lifetimes in excess of 300 hours.

While the principles of this invention have been described with particularity, it should be understood that various modifications and alterations can be made without departing from the spirit of the invention, the scope of which is defined by the appended claims.

What is claimed is:

1. A method for producing a low power, high energy source of electric current which comprises the steps of:
   A. providing a solid state electrochemical primary cell containing as essential components:

(a) a solid anode composed of an alloy selected from the group consisting of lithium-silicon and lithium-aluminum alloys,
(b) a solid cathode of a mixture having a ratio of (1) from about one to five parts by weight of ferric chloride and (2) about one part by weight of graphite, and
(c) a solid electrolyte consisting of lithium tetrachloroaluminate salt, said electrolyte positioned between, and, in contact with said anode and said cathode; and B. heating said electrochemical cell to a temperature in a range of from 85° C. to about 105° C. to draw an electric current therefrom while simultaneously maintaining said electrochemical cell in its solid state at a temperature below the melting points of its individual components.

* * * * *